(12) United States Patent
Minneman et al.

(10) Patent No.: US 6,243,740 B1
(45) Date of Patent: Jun. 5, 2001

(54) PUBLIC INTERACTIVE DOCUMENT

(75) Inventors: Scott Minneman, San Francisco; Dale MacDonald, Oakland; Jon Winet, Berkeley; Margaret Crane, San Francisco, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/023,861

(22) Filed: Feb. 13, 1998

(51) Int. Cl.[7] .................................................. G06F 17/00
(52) U.S. Cl. ............................ 709/206; 705/12; 345/329
(58) Field of Search ................................. 705/10, 12, 14; 707/901; 709/204, 205, 206; 345/327, 329, 330, 331; 340/825.71, 825.72, 825.73, 825.74

(56) References Cited

U.S. PATENT DOCUMENTS

| | | | |
|---|---|---|---|
| 4,569,026 | * 2/1986 | Best | 345/327 |
| 5,682,196 | * 10/1997 | Freeman | 384/13 |
| 5,808,662 | * 9/1998 | Kinney et al. | 348/15 |
| 5,848,934 | * 12/1998 | Shiels et al. | 463/9 |
| 5,872,927 | * 2/1999 | Shiels et al. | 709/206 |

OTHER PUBLICATIONS

ACM Transactions on Information Systems, vol. 10, No. 1, Jan. 1992, pp. 91–102, "The Active Badge Location System".

Communications of the ACM, Jul. 1993, vol. 36, No. 7, pp. 75–84, "Some Computer Science Issues In Ubiquitous Computing".

"Physical Meets Virtual—The Evolving Form Of Documents In The Digital Age", Idea Sparkers Connections—97, John Seely Brown, Jul. 19, 1997 Newspaper Association of America.

"The Changing World Of The Document & Work", John Seely Brown, FX CRL Opening Ceremony May 29, 1995.

* cited by examiner

Primary Examiner—Dung C. Dinh
(74) Attorney, Agent, or Firm—Fay, Sharpe, Fagan Minnich & McKee, LLP (57) ABSTRACT

The present invention provides a method and system of publicly co-creating a narrative document by parallel and on-going communication of a plurality of signals comprising public reactions to portions of the document, the signals being generated via one or more repurposed signaling devices. A display illustrates an introductory portion of the document intended to engender a public interest in the document and an emotive or intellectual reaction thereto. The document can comprise a dependent set of associated document elements which are sequentially variable for variation of document content to evolve different document narratives. The public viewing the display communicates, via the device or devices, a signal indicative of their reactions and for effecting a prospective scene selection in the document content that, in turn will vary the narrative.

21 Claims, 6 Drawing Sheets

PUBLIC INTERACTIVE DOCUMENT

BACKGROUND OF THE INVENTION

The subject invention relates to the field of document generation systems, and more particularly to a method and apparatus for utilizing public interaction for dynamically varying document content where the document is publicly displayed for concurrent adjustment by the interactants. The invention is particularly applicable to a large screen display of a narrative document in a public setting wherein the document content, e.g., a storybook of modular image elements, or its prospective sequence is adjusted based upon public communication of a signal by a signaling device made in response to the display. A public setting refers to a physical setting where multiple people can share a physical as distinct from merely sharing a virtual or "cyberspace" presence. Without limitation, examples of public settings include a street, a plaza, a shopping mall, an arena, a theater, a convention or exposition hall, a store front, a club, bar or restaurant, an amusement park or a ride or attraction therein, or a shared space in a work place or school building, such as an auditorium, gymnasium, cafeteria, atrium, lobby, corridor or conference room. However, the subject invention is applicable to any environment or system which provides generation of a document in a physical setting that presents an opportunity for communication of a plurality of reactions to the viewing of the document.

Interactive computer games are usually played by single users in a private setting. They require that the user be equipped with a personal computer and a CD-ROM. Although there are known instances of multi-user shared computer experiences, these are not publicly viewed. Typically, each player sits in the privacy of his or her own home, and the interaction with other players is entirely virtual. Special equipment (a PC, software, maybe a pair of virtual reality goggles or a data glove) is also required. Some specific examples are multi-user games, Dan's Apartment (a public access television show) and multi-user dungeons, such as LambdaMOO.

Arcade video games are also known where two players play against each other while spectators may crowd around and watch. Special equipment (the arcade machine) is required. There is a sharp demarcation between the players, who are fully engaged with the game and who interact physically with the arcade machine, and the spectators, who do not. There are no casual interactions with the game, and no one who is both a spectator and a participant.

Some systems, such as Lorna (an interactive laser art disk) have been devised for the private direction of a narrative story through a number of alternative paths and endings, as implemented in the interactive disk. Such a system lacks the important aspect of being publicly displayed and suitable for public interaction with the story.

Current personal computer systems allow multi-user interaction with commonly displayed visual images in such systems as on-line chat rooms or multi-player interactive games. Although the multi-user participation results in a document having varying content as a result of the participation, the document itself is not interactive, it has no internal "story" time frame, and there are no narrative forms wherein the sequential portions of the documents themselves are intended to communicate the story. There is typically no shared participation of users in a common public physical space. The sharing, such as it is, is virtual, not physical.

No known systems provide the rich, exciting experience of interaction among many spectator-participants in a public place to effectively coauthor a fictional or other narrative document, viewable by all of the spectator-participants, to evolve the narrative both in a real time and in its own internal "story" time, wherein the narrative is communicated by the resulting sequence evolution as a direct result of the public interaction.

Indeed, there are only a few known instances of public interactive documents and these have notable limitations. Interactive films have a large granularity. There are only one or two branch points and, at most, a few possible branches. For example, in a 90 minute film, the audience gets to pick one of four 15-minute endings. Cinematrix comprises a "ping-pong paddle" system disclosed in U.S. Pat. No. , , . Here the spectator-participants (or, "interactants") all must be equipped with special hardware, in this case a special red-green ping-pong paddle.

BRIEF SUMMARY OF THE INVENTION

The present invention contemplates a new and improved document generating system which overcomes the limitations of interactive participation with known mass media systems to effectively combine the advantageous features of a public interaction for evolving a narrative document with a communication scheme involving a commonly available communication device.

In accordance with the present invention in one aspect there is provided a method and system of publicly authoring a narrative document by parallel and ongoing communication of a plurality of signals comprising public reactions to portions of the document, the signals being generated via one or more signaling devices. A display illustrates an introductory portion of the document intended to engender a public interest in the document and an emotive or intellectual reaction thereto. The document can comprise a dependent set of associated document elements which are sequentially variable for variation of document content to evolve different document narratives. Persons viewing the display communicate, via their signaling devices, one or more signals indicative of their reactions and for effecting one or more prospective scene selections in the document content that, in turn will vary the narrative.

The signal is identified by monitoring a plurality of frequencies assigned to such signaling devices by monitoring signal strength on those frequencies. When a signal is detected, the display is adjusted by selecting a next document element in response to the signal, thus varying the overall display of document element sequence so that the narrative document is continually revised in respect to the communicating of the signal.

In accordance with another aspect of the present invention, the document comprises video and audio data and the generating of the document elements includes displaying the data in a storage device such as segregable scene and sound directories. The video data can comprise a plurality of tokens to elicit the response, such as colors, text, or images.

In accordance with a more particular aspect of the present invention, the publicly displaying comprises disposing the document in a billboard format in a location viewable by a large number of people.

In accordance with yet another more particular aspect of the present invention, monitoring the signals comprises recognizing a time when the signal is communicated in association with the displaying of a token indicative of the emotive or intellectual reaction.

One benefit obtained by the present invention is a generation of a new kind of public document through an interactive participation of any member of the public viewing the document and possessing a signaling device. The co-creation of the document provides for a publicly shared experience in helping to construct the narrative which can be sensitive to a predominant public emotion or even individual reactions to the display of the document. However, the public interaction need not be cooperative, in that public participation can be limited merely by proximity to the display and not with regard to any threshold qualifications.

Another benefit obtained from the present invention is the repurposing of everyday objects for use as signaling devices in the creation of the document. Garage door openers, key fobs, remote controls, pagers, even automobile headlights or horns, can be utilized for communicating the determinative signals. Typically, in the embodiments to be described, a radio signaling device is preferable and most convenient.

A further benefit of the present invention is the dynamic generation of the document narrative without structural limitations as to time. A narrative possesses dual time elements in that, as the narrative evolves, it does so both in real time (that of the reader or viewer) and in its own, internal "story" time frame (that of the characters Within the narrative). These two time elements are more or less independent of one another; for example, even as the viewer-participant experiences the passage of real time, the internal time of the story can move forward at a faster or slower rate, can move backwards (as in a flashback), can jump ahead, can cycle back to the beginning, etc. Thus, according to the invention, the dual time structure of the narrative facilitates viewer-participant coauthorship of the documents according to participation ability and convenience and without necessity for a strict coupling of (for example) narrative progression to real-time events.

Other benefits and advantages for the subject new document generation system will become apparent to those skilled in the art upon a reading and understanding of this specification.

BRIEF DESCRIPTION OF THE DRAWINGS

The invention may take physical form in certain parts and steps, and arrangements of parts and steps, the specific embodiments of which will be described in detail in this specification and illustrated in the accompanying drawings which form a part hereof and wherein.

DETAILED DESCRIPTION OF THE INVENTION

A specific embodiment of the invention was recently done as a piece presented in conjunction with ACM SIGGRAPH, in August 1997, in Los Angeles, California. There is a nightclub on Sunset Boulevard that has two Sony JumboTron® giant (9'×12') television screens on its outdoor facade. The screens are viewable by passing motorists and pedestrians. There is also a micro-power FM radio station on site.

The inventors authored a piece of interactive fiction, described by some as a "drive-by soap opera", that played on the JumboTron® displays. Passing motorists and pedestrians on Sunset Boulevard could alter the narrative that was played out, as it was playing out, by clicking their garage door openers and alarm system key fobs at the screen.

Through a juxtaposition of evocative imagery, including images of single human characters or small groups (two- or three- person shots), together with evocative texts, colors and symbolic images, the spectator-participants who were the audience could co-create the story. This was a fluid, sometime ambiguous narrative, but a narrative nonetheless. It will be appreciated that the invention is applicable as well to less ambiguous, more traditionally scripted kinds of stories, and to presentations for purposes other than art or entertainment, such as advertising.

Figure 1:
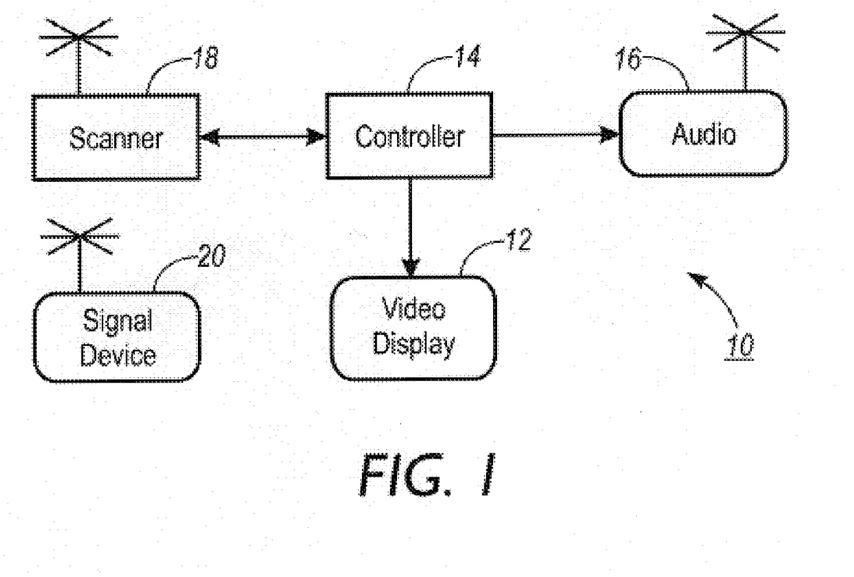
FIG. 1 is a block diagram of a system for implementing the subject invention.

Referring now to the drawings wherein the showings are for purposes of illustrating the specific embodiments of the invention only, and not for purposes of limiting the same, FIG. 1 shows an assembly 10 comprising, in its most simple form, a video display device 12, a controller 14, an audio transmitter 16, a scanner 18, and a signaling device 20.

The video display 12 can be anything that would satisfy the intended function of a large-area public display perceptible by a number of people in a manner where close proximity to the display is not necessary. In the above implementation, two Sony® JumboTrons®, arranged in essentially a billboard format were successful. Video walls could also be used, depending on the desired resolution demanded by the data stream comprising the narrative document. If more sophisticated display formats, such as image scrolls, pans and zooms, as well as a variety of text effects are desired, higher resolution displays may be desired. Regardless, so long as a display 12 can adequately communicate the document elements intended to eventually form the narrative document in a perceptible manner, the display will be satisfactory.

The controller 14 comprises a computer which controls the data stream perceived as the narrative document on a display. The controller 14 includes conventional memory storage devices (not shown), in which various directories for image, textual or audio information can be accessed. A controller will decide when to adjust a sequence of document elements in response to a signal communicated from the public in a manner as will be more fully explained below.

The scanner 18 monitors low-power radio signals on frequencies ranging from 280 to 440 MHZ, generated by garage door openers, and alarm system key fobs. Such devices transmit a brief, low-power radio signal typically from one-quarter to one-half of a second in duration. Conventional radio technology will allow a scanning of these frequencies in less than one second for monitoring comparative signal strength throughout the identifiable channels in the frequency range. Since there is a considerable amount of RF pollution in these frequencies and the noise in the frequency varies widely over the course of a day (e.g. between night and day), the preferred embodiment merely involves a threshold determination of whether there is a signal being communicated based on this monitoring signal strength. A monitoring algorithm picks out the intended signal from ambient noise by identifying if a current signal strength is approximately three-times stronger than the running average signal strength. If such a signal strength is determined, then the controller will recognize that the signal from the scanner is a signal being communicated from a viewer-participant on a particular channel. If the signal strength does not exceed this threshold, then whatever signal is detected is incorporated by the controller 14 in a computation of the running average signal strength for the channel. The system thus keeps tracking the signal noise on a particular channel to compensate for the varying levels of radio noise between times of day. Thus, the system 10 merely treats the signal as present or absent and does not decode the digital information contained in each signal burst. However, such decoding is within the scope of the invention for identifying particular users and would merely require more sophisticated radio signal processing equipment for the scanning operation.

Alternatively, the controller 14 could also operate to distinguish predominant public reactions to comparative document element displays, thereby implementing what is essentially a voting recognition scheme, and for identifying those elements obtaining greater public appeal or interest. Such voting recognition can be particularly useful when large numbers of signals are being monitored for determining the evolution of the narrative.

The audio transmitter 16 essentially comprises a low-power radio transmitter intended to generate a signal detectable by a car radio or other portable radio devices for an accompanying sound track to the document being viewed on the display 12. The audio sound track can include spoken text and musical scores.

Lastly, the signaling device 20 typically comprises a garage door opener or key fob for generating signals from a viewer-participant. More generally, a commonplace object that is likely to be ready at hand for many viewer-participants, and that can be repurposed to provide a suitable electromagnetic, audio or other signal, will do. The signaling device(s) chosen will vary according to the particular circumstances of the embodiment (e.g., what the target audience is likely to have on hand).

In the public physical setting, a plurality of viewer-participants, each having his or her own signaling device 20, are usually present. They may be there all at once, or come and go at different times, or some combination of these. Thus, typically there will be a number of signals from a number of devices 20.

Figure 2:
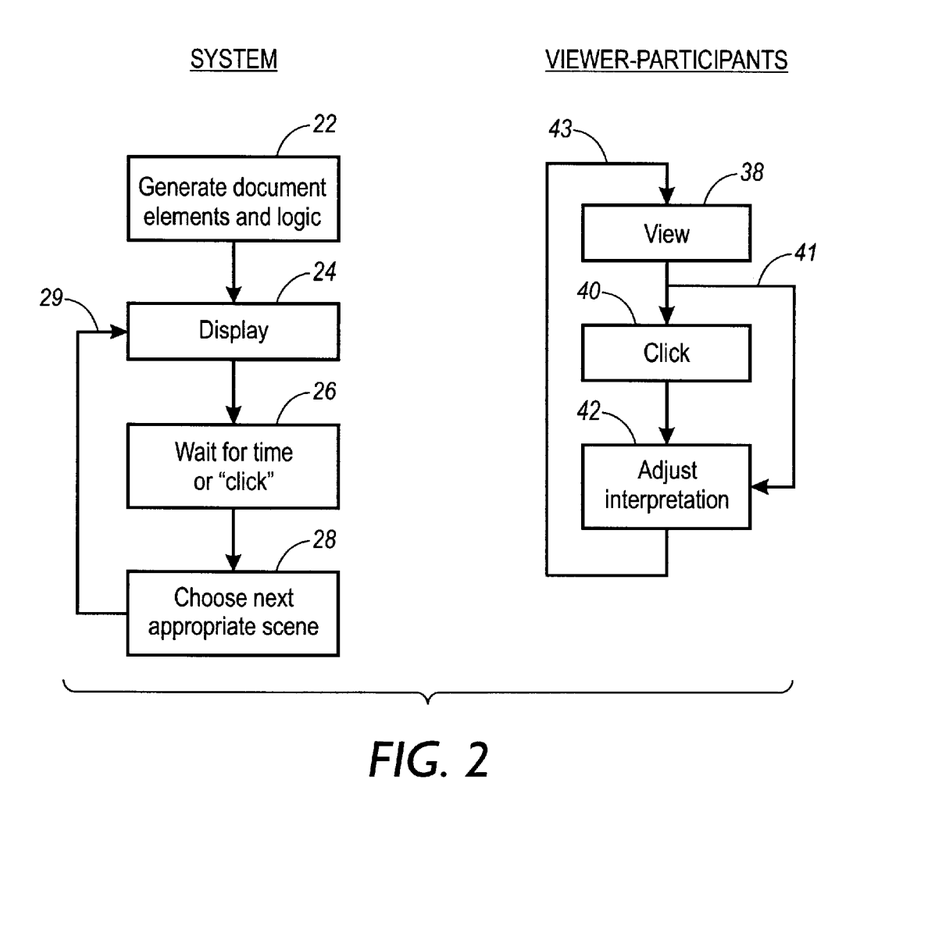
FIG. 2 is a pair of flowcharts illustrating the steps taken to implement the invention from two different standpoints.

With particular reference to FIG. 2, a method for implementing the subject invention is explained from the perspective of the system and that of the viewer-participants. From the system's standpoint, the first step comprises the generating 22 the document elements and logic. The elements can comprise the video, sound and text elements to be displayed or communicated. The next step is an introductory or partial display 24 of the document intended to engender a responsive emotive or intellectual reaction from the viewing public. It should be noted that such reaction will vary among different participants and as such is essentially personal and subjective.

Figure 8:
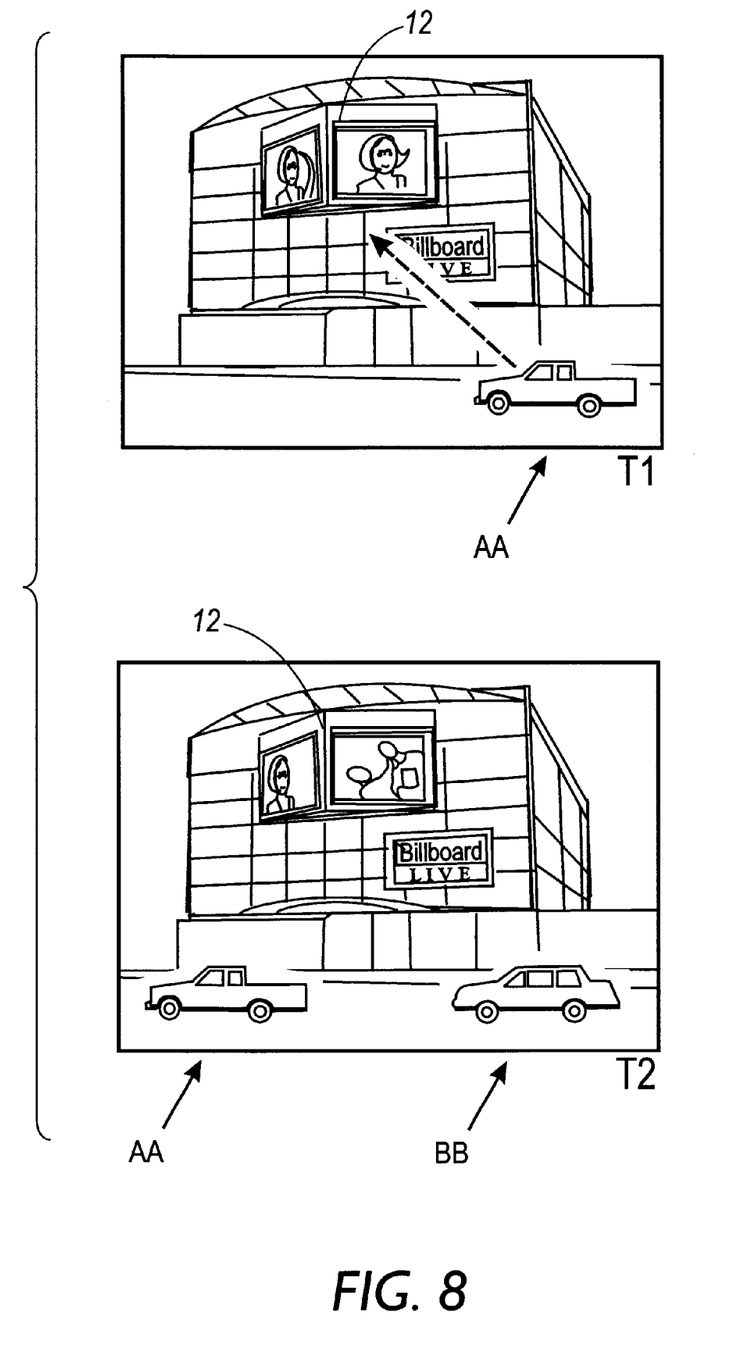
FIG. 8 comprises consecutive scenes of an implementation of the invention for illustrating the dual time line nature of a narrative generated in accordance with the present invention.

One of the features of the document is that it has a dual time line, comprising an internal "story" time line and a "real" time line corresponding to the construction of the narrative document itself. As the display of the image occurs in real time, wherein various document elements of the document are sequentially displayed on the display 12, the story time line can vary according to the narration determined by the public participants. For example, with reference to FIG. 8, at real time T1 a first car AA drives past the display 12. The person in car AA clicks the communication device 20 at the display and the system 10 senses the signal. At a later real time T2, as the person in first car AA has driven past the billboard, that person may or may not see the outcome of their signal, but the scene on the display is altered in response to the signal; and, despite there being a forward real time evolution between Ti and T2, the narrative may have actually taken a step backwards in story time, for example, a flashback. The new scene is viewable by the person in second car BB, since car BB has passed into viewing range of display 12 during the time interval between T1 and T2. Thus, the real time line for the interactants is actually different from the story time line of the narrative evolving on the display, and the individual "authors" and viewers can vary throughout both time lines. Note that in practice, there can be many (e.g., tens or hundreds or more) viewer-participants, depending on the setting and circumstances of the particular embodiment. FIG. 8 illustrates only two viewer-participants, but this is only for simplicity of exposition.

Continuing with FIG. 2, the system waits 26 for a timeout or a "click" communicating the signal and then chooses 28 a next appropriate scene. At this point, the flow of control loops back 29 so that this system displays 24 the newly chosen scene and waits 26 for their click, prompting a choice 28 of yet another scene, and so on.

Figure 5:
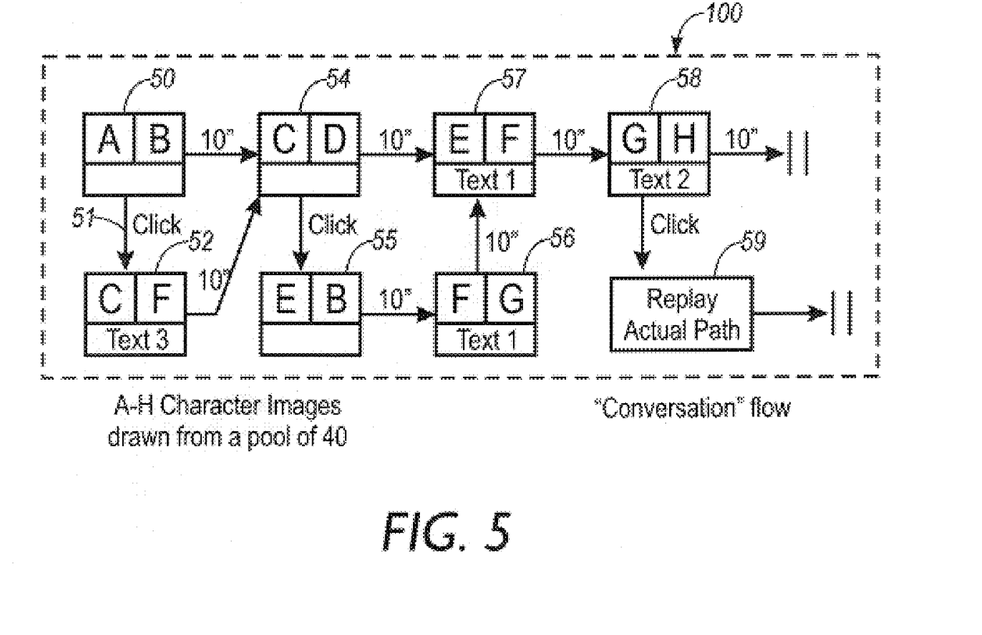
FIG. 5 is an example of a series of displays changing in accordance with one scheme of the invention.

With reference to FIG. 5, a specific example of a conversation flow where the images are adjusted in response to the clicks or timeouts is shown. Interaction model 100 includes scenes 50, 52, 54, 55, 56, 57 and 58 and a set of pathways or links connecting them. Images A–H are, in this embodiment, character images drawn from a pool of forty (40) images. Texts 1, 2, 3, are evocative texts. At scene 50, the display shows two character images A, B and the scene will change to either character images C, D or C, F, depending upon whether the system senses a click, in which case C, F are displayed 52 or a whether 10-second timeout occurs in which character images C, D are shown in scene 54. Also in scene 52, a text 3 is shown. Thus, the interacting click 51 has the effect of changing the sequence of display from scene 50 to scene 54 after a normal, 10-second timeout to a sequence comprised of scene 50, scene 52 and then scene 54 after a 10-second timeout. Alternative pairings and/or text for scanning 55–58 are shown in the event of clicks or timeouts. Another possible result of clicking at scene 58 is to replay 59 the path already seen.

Returning again to FIG. 2, the viewer-participants' perspective is effectively a viewing 38 of the display and responding with either a click 40 or a non-response 41, wherein the scene will be changed and the viewer will adjust 42 his interpretation in response to the change. As in the system perspective, a loop back 43 completes the cycle. The viewer-participants thus can alternate between successive views and responses.

It will be appreciated that the invention facilitates the document generation by mere casual contact and that an individual viewer-participant need not remain present throughout the entirety of the narrative presentation. In the SIGGRAPH embodiment, for example, pedestrians and motorists on Sunset Boulevard might encounter the piece at different times of day or night, whenever they happen to pass the section of Sunset Boulevard where the piece was playing, each time seeing a different segment of the piece and experiencing a different set of interactions with the piece, according to the particular segment shown and the reactions of the viewer-participants who happen to be present. More generally, the invention facilitates casual contact by multiple parties whose interaction with the document in a public setting causes changes to the narrative progression (e.g., story time sequence) of the document. Importantly, the changes to the narrative are facilitated or even wholly mediated automatically, as by computer assistance from controller 14, without the need for continual interaction by human operators or actors during the narrative presentation. Thus, the invention is particularly suitable to a public setting wherein casual, non-sustained contact, such as walk-up/walk-away pedestrian traffic, passerby pedestrian or motor traffic, etc. are the norm and wherein the viewer-participant do not have even temporary possession over the display device used to present the narrative. This casual interaction with the system contrasts with, for example, a conventional video arcade game, in which the viewer or player is expected to engage more or less his or her full attention throughout an extended interaction with a computer system over which he or she exercises exclusive or semi-exclusive control during the course of a gam. (Note also that typically in a video game, a player's actions and the game's responses are closely coupled to one another and both take place in real time. There is no distinct story time frame as there would be in a narrative.)

Figure 3:
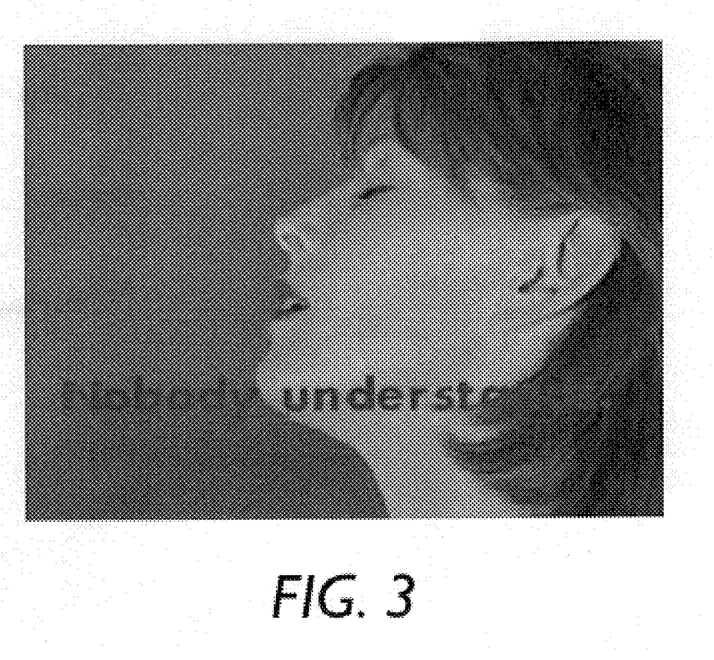
FIGS. 3 and 4 comprise exemplary document elements presented on the display.
Figure 4:
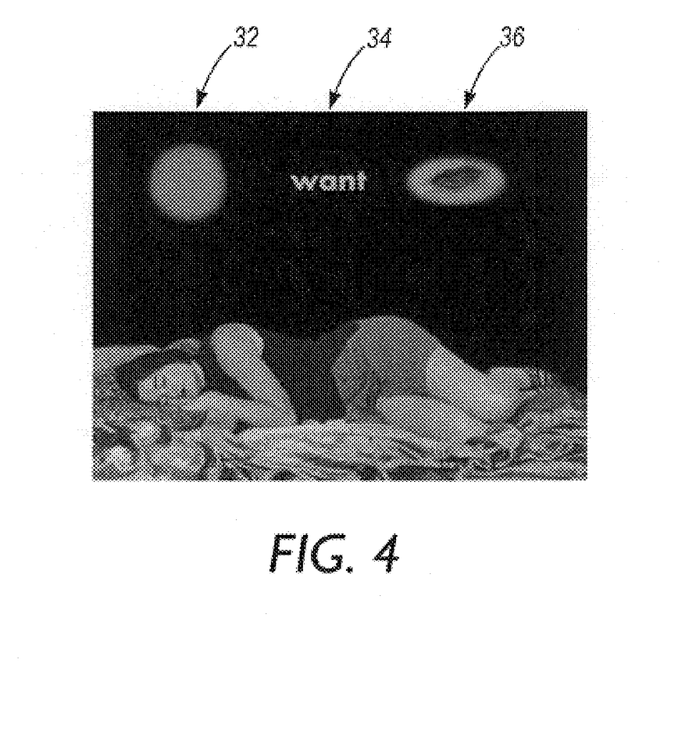

Following the actual implementation of the system in the SIGGRAPH embodiment further clarifies the invention. With reference to FIG. 3, the public would view a document element such as that comprising the image of the face of a woman with a somewhat concerned look and the textual element, "Nobody understands". The viewing of this portion of the display will engender a reaction to the public/participants. With reference to FIG. 4, a next sequential document element that is displayed is the scene of the woman sleeping, "JULIE'S DREAM". Across the top portion of the scene are three types of tumblers, or tokens, 32, 34 and 36. Token 32 comprises one of a plurality of colors, token 34 comprises one of a plurality of textual words, and token 36 comprises one of a plurality of body parts, in this case a woman's mouth. The step of communicating a signal indicative of the response to the partial displaying for effecting a next sequential variation in the document comprises responding, i.e., "clicking", to the tokens in a manner to communicate the reaction. For example, the color tumbler 32 may sequentially change from yellow, to red, to green, to black, etc. If the viewer/participant communicates the signal at the time of the display of a red token 32, in combination with a "want" text token 34 and the mouth token 36, then the next sequential scene may tend toward some love or sexual sequence, since the selected tokens would seem to indicate that the woman's dreams were evolving in that way. Alternatively, if the selected tokens had been "green", "want" and an "eye", then the story line would evolve in another direction, perhaps economic or something suggesting a jealous relationship.

In this implementation, the waiting step 26 at this point in the narrative comprises scrolling through the various options of the tumblers 32, 34, 36 and selecting the tumbler token which appears most consistent with the viewer-participants' reaction to the narrative document so far. The signal is monitored 48 by the system 10, as noted above, by relative signal strength during the displaying of the tokens.

Lastly, the choosing step 28 is implemented by the controller 14 to select a next video and audio display in accordance with the monitored signal.

Figure 6:
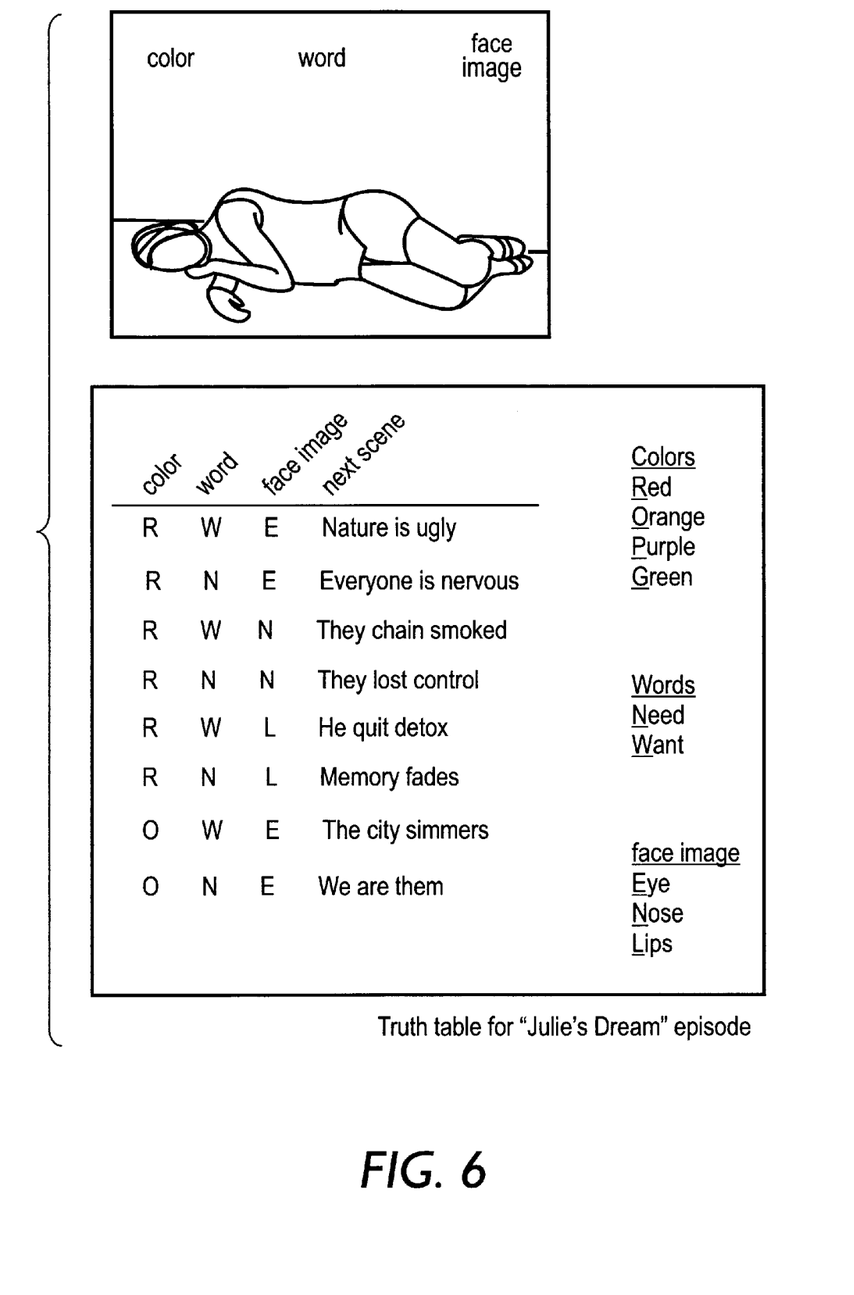
FIG. 6 is a truth table indicating a next scene sequence in response to interactant selections in another scheme of the invention.

With reference to FIG. 6, a representative portion of a truth table for the "JULIE'S DREAM" episode is shown. In the first line of the truth table it can be seen that if a tumbler combination of the color red, the word "need", and the base image "eye" were clicked by the observers, the next scene would be the one entitled "Everyone is Nervous." After the selected scene is played out, the display returns to the image of Julie for the selection of the next tumbler combination.

The alternative implementations of the system as either the "Julie's Dream" embodiment of FIGS. 3, 4 and 6, or the character image sequencing of FIG. 5 are just two examples of how public interaction with the system effects the creation of new scene sequences and narratives.

Figure 7:
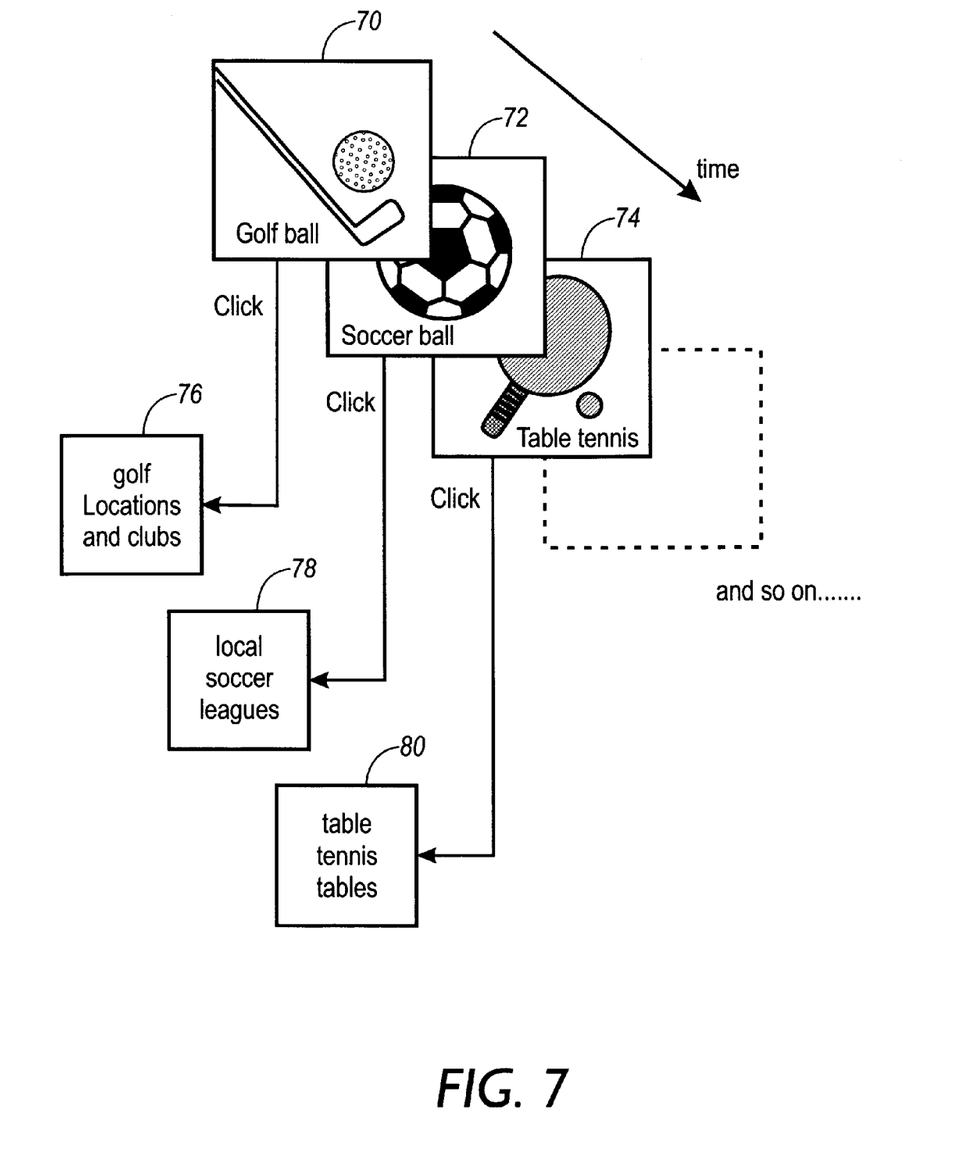
FIG. 7 is an exemplar of another type of display sequence in accordance with an alternative embodiment of the invention.

FIG. 7 illustrates how the system could be implemented in a mall-type setting, wherein advertising or product information can be obtained. For example, three scenes, 70, 72, 74 are sequencing on the display. When a click signal is sensed for each of the displays, respectively, the next scene will change to display related information to the clicked scene. For example, if the click is sent in association with the golf ball scene 70, the next scene will comprise information about golf locations and clubs 76. For a soccer ball click, information concerning local soccer leagues 78 is displayed, and for a table tennis click information about table tennis tables 80 is the next scene.

In the SIGGRAPH embodiment, the invention's visual track was comprised of graphics, text and still photography in a "soap opera" type genre. See FIGS. 3 and 4. For the photography, a blue screen studio was used to provide source materials with the most versatile editing possibilities. A high-end, high resolution digital camera (Nikon®/Fuji® E2-1000×1200 pixels) was used to produce 4,000 compressed JPEG files that represented the photographic images in digital form.

The actors supplied wardrobe and props suggestive of soap-operatic themes: evening gowns, surgical scrubs, lab coats, leather jackets, DKNY® sunglasses, tennis togs, stethoscopes, tank top tee-shirts, terry robes and silver-threaded tuxedo jackets. Narrative fragments—scenes staged and motivated by the soap-opera genre of the piece—were suggested to the actors during the shoot. For example, In a three-shot (i.e., a shot with three people), one of the actors was told: "You feel threatened by the intimacy of their relationship." In a two-shot, the patient is told: "The doctor is informing you that the cancer is in remission."

The images were accumulated and grouped, combined with evocative texts and all placed within interactive models (for example, like interaction model 100 shown in FIG. 5), so that the evocative texts could be understood by the public viewers in as little as six seconds and the texts were "modular" enough to combine with an ever-changing series of images. For some sequences, the writing would remain constant while clicking would change the images. For others, clicking would bring up or begin text events that altered the narrative context for the images.

Alternative embodiments of the invention include directional voting, wherein custom antennas with directional qualities will attend to signals coming from one set of viewers whilst rejecting signals from another. This is made somewhat more difficult by the wide range of frequencies under consideration, but some measure of this effect is certainly plausible. This will enable interaction modes that might include eastbound/westbound voting or independent interactions on each of the two screens. Phased arrays will present even more interesting possibilities.

One exceedingly attractive, although difficult, addition to the system would be to actually identify the individual signals coming from specific viewers. This is complicated by several factors, which include the fact that the scanner seldom gets all of any particular signal (because it is scanning through many frequencies), that the digital coding of the incoming signals is not consistent across the various brands and types of devices, and that many devices now change their codes after each transmission in an attempt to deter code snooping. This may be pursued further, but it is suspected that it would require a considerable custom hardware design and development effort to get reliable functionality in this area.

A number of techniques are known for interacting with users who have a single switch as an input device. One of these, row/column scanning, is a particularly attractive addition to the repertoire of interaction techniques for the subject invention. It will be most applicable where there are a large assortment of choices in settings where the users will spend enough time with the installation so that they can make sense of how the interaction works and what they've done.

The invention has been described with reference to specific embodiments. Modifications and alterations will occur to persons of skill in the art upon the reading and understanding of this specification. It is our intention to include all such modifications and alterations insofar as they come within the scope of the appended claims or the equivalents thereof.

What is claimed is:

1. A method of authoring a continually alterable mass media document, the document being harvested from a data stream responsive to remote interactive communication via a plurality of signaling devices from a public audience, comprising steps of:
    generating the data stream as a dependent set of associated document elements wherein the elements are variable for variation of document content;
    displaying a portion of the data stream;
    communicating via the plurality of signaling devices a plurality of signals indicative of a response from the public audience to the displaying for effecting the variation in the document content;
    identifying the signals by monitoring the signals during the displaying for recognizing a voting composition of the signals indicative of a predominant public reaction to the data stream; and,
    adjusting a sequence of the document elements in response to the voting composition for varying the displaying of the data stream whereby the mass media document is continually revised in response to the communicating.

2. The method as defined in claim 1 wherein the document comprises video and audio data and the generating includes disposing the data in a storage device as segregable scenes and sounds.

3. The method as defined in claim 2 wherein the displaying comprises displaying the video data on a publicly viewable display screen and broadcasting the audio data as a radio signal detectable in a car radio.

4. The method as defined in claim 2 wherein the video data comprises a plurality of tokens intended to elicit the response, wherein the response is indicative of a desired evolution of the data stream and the monitoring includes detecting the signals in association with a certain one of the tokens.

5. The method as defined in claim 4 wherein the adjusting includes selecting a next document element for the displaying in response to the recognizing of the certain one of the tokens.

6. The method as defined in claim 4 wherein the tokens comprise colors, texts or images representative of the response to the displaying.

7. The method as defined in claim 1 wherein the signals from the signaling devices comprise a radio signal.

8. The method as defined in claim 7 wherein the radio signal originates from a repurposed object.

9. A method of dynamically varying a display format of artistic scenes suggestive of a narrative document through public interaction with a display control by a general communication device, comprising steps of:
    publicly displaying a sequence of scenes for engendering a responsive reaction thereto;
    communicating via the general communication device a plurality of signals indicative of the public responsive reaction;
    monitoring the signals in accordance with predetermined conditions for recognizing the reaction by a predominant public interest expressed as a voting measured by the plurality of signals;
    adjusting the displaying in accordance with the reaction by varying the display in a manner responsive to the signals; and,
    continuing the varying over a plurality of cycles of the sequential display for public entertainment in the viewing and interactive authorship of the resulting narrative document.

10. The method as defined in claim 9 wherein the publicly displaying comprises disposing the document in a billboard format at a location viewable by a large number of people.

11. The method as defined in claim 9 wherein the displaying comprises video and audio elements, the video elements including tokens for indicating a time for the communicating of the signals.

12. The method as defined in claim 11 wherein the tokens comprise symbols representative of the reaction to a foregoing portion of the displaying.

13. The method as defined in claim 12 wherein the tokens comprise colors, texts or images and the communicating comprises associating the signal with a one of the tokens.

14. The method as defined in claim 13 wherein the monitoring comprises recognizing the time when the signals are communicated in association with the displaying of the one token.

15. The method as defined in claim 14 wherein the recognizing includes identifying a plurality of different signals from a plurality of different participants.

16. The method as defined in claim 15 wherein the predetermined conditions comprise numeric limits counted for particular tokens.

17. The method as defined in claim 9 wherein the varying the sequential display includes changing a sequential order of scene display or frequency of scene display.

18. The method as defined in claim 9 wherein the general communication device comprises a common radio transmitter having a primary purpose other than communicating the signals.

19. A method for interactive construction of a publicly shared narrative document having a dual time line comprising a story time line and a real time line corresponding to the construction, the method comprising the steps of:
    displaying a partial sequence of document elements for engendering a responsive reaction, the displaying occurring in accordance with the real time line;
    public communicating of a plurality of signals responsive to the displaying intended for adjusting the displaying in accordance with a voting recognition of the signals interpreted as a public reaction to the displaying;

monitoring the signals; and, adjusting the displaying of document elements based on the signals for constructing the narrative document in accordance with the story time line.

20. A system for creating a public narrative document by parallel and ongoing communication of a plurality of signaled public reactions to portions of the document, the document being selectively evolved as a function of the communication, the system comprising:

a display for an introductory portion of the document intended to engender a public interest in the document and an emotive or intellectual reaction;

a receiver for receiving public signaling of the communication; and, a controller for identifying the reaction from the communication expressed as a voting response by the public signaling and selecting oncoming portions of the document in response to the reaction.

21. The method as defined in claim 8 wherein the repurposed object selectively comprises a garage door opener, key fob, pager or cell phone.

* * * * *